US005172395A

United States Patent [19]

Dapper et al.

[11] Patent Number: 5,172,395

[45] Date of Patent: Dec. 15, 1992

[54] METHOD OF AND APPARATUS FOR DERIVING AN INDICATION OF NOISE CONTENT OF DATA BITS

[75] Inventors: Mark Dapper, Cincinnati; Terrance Hill, Fairfield, both of Ohio

[73] Assignee: Cincinnati Electronics Corporation, Cincinnati, Ohio

[21] Appl. No.: 738,984

[22] Filed: Aug. 1, 1991

Related U.S. Application Data

[62] Division of Ser. No. 396,876, Aug. 22, 1989, Pat. No. 5,073,905.

[51] Int. Cl.[5] .............................................. H03D 1/04

[52] U.S. Cl. ........................................ 375/99; 375/10

[58] Field of Search ..................... 375/94, 95, 97, 114, 375/116, 99, 10; 371/31, 61, 62; 455/296

[56] References Cited

U.S. PATENT DOCUMENTS 4,242,755 12/1980 Gauzan .............................. 375/114
4,414,676 11/1983 Kraul et al. ......................... 375/116
4,445,224 4/1984 Ihira et al. .......................... 375/120
4,457,005 6/1984 Burke et al. ......................... 375/120
4,517,682 5/1985 Neyer ................................. 375/106
4,535,461 8/1985 Stepp et al. ......................... 375/110
4,538,172 8/1985 Iwase et al. .......................... 358/13
4,546,322 10/1985 Crutcher ............................ 375/120
4,607,296 8/1986 Smidth ................................ 360/61
4,616,211 10/1986 Ross et al. ......................... 375/106
4,617,677 10/1986 Chiba ................................ 375/94
4,627,080 12/1986 Debus, Jr. .......................... 375/110
4,677,648 6/1987 Zurfluh .............................. 375/120
4,680,780 7/1987 Agoston ............................. 375/120
4,745,626 5/1988 Wells ................................. 375/94
4,754,467 6/1988 Banwart et al. ..................... 375/94
4,808,884 2/1989 Hull et al. .......................... 375/120
4,821,297 4/1989 Bergmann et al. ................ 375/106

*Primary Examiner*—Stephen Chin
*Attorney, Agent, or Firm*—Lowe, Price, LeBlanc & Becker

[57] ABSTRACT

An indication of the noise content of data bits on a signal line is derived by sampling the amplitude of a signal on the line several times during each of the data bits to derive for each data bit a several bit binary word. Each bit of the several bit word has a value dependent on the amplitude of the signal on the signal line at the time the sample is taken. In response to the number of binary value transitions in each several bit binary word an indication of the noise content of each data bit is derived.

29 Claims, 2 Drawing Sheets

19
256 X 8 BIT
EPROM
HARD
DECISION
DATA BIT
HARD
DECISION
BIT
CHARACTER
DECODER 19
256 X 8 BIT
EPROM
HARD
DECISION
DATA BIT
ERASURE
BIT
HARD + ERASURE
BIT CHARACTER
DECODER 19
256 X 8 BIT
EPROM
HARD
DECISION
DATA BIT
QUALITY BITS
SOFT DECISION
BIT CHARACTER
DECODER

METHOD OF AND APPARATUS FOR DERIVING AN INDICATION OF NOISE CONTENT OF DATA BITS

This application is a division of application Ser. No. 07/396,876 filed Aug. 22, 1989, U.S. Pat. No. 5,073,905.

TECHNICAL FIELD

The present invention relates generally to deriving an indication of received data bits and more particularly to an apparatus for and method of deriving such an indication by monitoring the number of binary transitions of several samples taken during a received binary data bit.

BACKGROUND ART

There are many different, but generally related, methods and devices used for recovering a clock signal from random data bits received by a receiver. Such devices include a local oscillator, having a phase and/or frequency that is adjusted to the phase and/or frequency of the received data. A phase error signal indicative of the deviation between the received data bits and an output of the local oscillator is derived. The phase error signal is filtered or averaged to derive a control signal for the phase of a clock signal derived from the local oscillator. Thereby, the local clock signal is synchronized to the phase of the incoming data bit stream.

A typical prior art device for deriving the phase error indication employs so called early-late gate circuitry. In such circuitry, a phase error signal for each received data bit is derived by dividing each bit into two time sequential halves, the occurrence times of which are controlled by the phase of the clock signal. The relative energy in the two halves resulting from each bit is determined by integrating the first and second halves of each bit. The absolute value of the integrated halves are compared to derive the control signal for the local oscillator. In response to the two halves having the same energy, no phase change occurs in the local oscillator. If, however, the local oscillator and the received data stream do not have the same phase, one of the halves of the data bits has a transition therein. Thereby, the integral over the bit half having the transition therein is smaller than the other bit half, resulting in the derivation of a finite, non-zero error signal. The phase error signal either advances or retards the local clock until data transitions of the received data bits occur at the boundary between the early and late halves.

A primary disadvantage of the typical early-late gate arrangement in achieving synchronization between a local oscillator clock source and the received data stream concerns the manner in which the phase error signal is derived. The maximum phase error occurs when the local oscillator is phase displaced by one quarter of a bit from the received bit. The phase error signal has a zero value in response to the phase of the received bit and the local oscillator being in phase, as well as one half bit out of phase. In a theoretical, noiseless system, it is possible for the local oscillator to become synchronized to the received bit stream at a position such that the local oscillator is phase displaced by one half a bit from the bits of the received data stream. In actuality, synchronization in this manner does not occur because of noise superimposed by the transmission medium on the received bits. However, the non-monotonic nature of the relationship between phase displacement of the local oscillator to the received data stream bits versus the amplitude of the phase error signal can cause a substantial time delay in achieving synchronization between the clock signal and the received data stream.

The typical prior art early-late gate systems have employed analog components, although some systems have employed more reliable digital techniques. One such digital technique is disclosed in Stepp et al, U.S. Pat. No. 4,535,461. In the Stepp et al patent, each bit of a received random data stream is divided into several samples of the amplitude of the bit. Each sample causes a binary sub-bit to be derived so that the binary value of a sub-bit depends on the amplitude of the corresponding sample; in the specific example of the Stepp et al patent, each received data bit is divided into sixteen sub-bits. The number of binary one bits in the first eight sub-bits is compared with the number of binary one bits in last eight sub-bits of each received data bit. In response to the number of binary one bits in the two halves being equal, the frequency of pulses derived from a local clock source, which derives an output to control the sampling times of each received data bit to derive the sub-bits, is set to a median, predetermined value. In response to the number of binary ones in the first half of each received data bit exceeding the number of binary ones in the second half of each received data bit, the frequency of the local oscillator is incremented to a second predetermined frequency and there is a predetermined fixed advance in the sampling times of the following received data bits. In response to the number of binary ones in the second half of each received data bit exceeding the number of binary ones in the first half of each received data bit, the local oscillator frequency is decremented from the median value, to a third predetermined value and there is a predetermined fixed delay in the sampling times of the following received data bits. Control of the local oscillator is preferably attained by averaging a comparator output indicative of the relative number of binary one bits over several received bits.

To determine the value of the received binary bit, the binary value of the sixteen sub-bits is compared with a threshold value.

The prior art Stepp et al system, in addition to being somewhat complex, reacts relatively slowly to control the clock synchronization. The slow response time is due to the need to filter the output of the comparator, as well as the relatively low resolution of the comparator. In the Stepp et al device the same control is provided for the local oscillator regardless of the phase displacement between the clock and the received data bits. For example, the phase control signal has the same value for a phase displacement between the local oscillator and the received data bit of seven-sixteenths of a received data bit as for a phase displacement of one-sixteenth of a received data bit.

A further object of the invention is to provide a new and improved relatively high speed apparatus for synchronizing a local oscillator to bits of a received data stream.

It is frequently desirable, particularly in noisy transmission links, to provide signals to different types of bit decoders. For example, if the transmission link has a relatively low noise level, whereby the received signal has a high signal-to-noise ratio, a bit to character decoder responsive to hard bit decisions is adequate. In other, noisy transmission links wherein the received signal has a low signal-to-noise ratio, frequently resulting in multiple transitions within a bit, a so-called erasure bit is derived and combined with a hard decision bit in a bit to a character decoder of another type. In transmission links having greater noise, resulting in received data bits having even lower signal-to-noise ratios, a hard decision bit is combined with plural "quality" bits which are supplied to still another type of decoder. Prior art systems have required considerable hardware or computer requirements to derive the erasure and quality bits.

An object of the invention is to provide a new and improved apparatus for and method of deriving indications of the noise level of a binary data bit received by a receiver over transmission links having varying noise characteristics.

DISCLOSURE OF THE INVENTION

In accordance with one aspect of the present invention, an apparatus for indicating the noise content of a received data bit of a digital data bit stream comprises means for sampling the binary value of the received data bit several predetermined times during the data bit to derive for the data bit a several bit binary word representing the sampled values. Means responsive to the number of transitions in the binary values of the sampled bits for the received data bit derives an indication of the noise content of the received data bit. Preferably, the means for indicating is responsive to the position of the transitions.

In accordance with another aspect of the invention a method of deriving an indication of the noise content of a data bit of a binary data bit stream on a signal line includes sampling the amplitude of a signal on the signal line several times during the data bit to derive for the data bit a several bit binary word. Each bit of the several bit word has a value dependent on the amplitude of the signal on the signal line at the time the sample is taken. In response to the value of the bits in each several bit binary word an indication of the noise content of the data bit is derived.

In accordance with a further aspect of the invention an indication of the noise content of a data bit of a binary data bit stream on a signal line is derived by sampling the amplitude of a signal on the signal line several times during the data bit to derive for the data bit a several bit binary word. Each bit of the several bit word has a value dependent on the amplitude of the signal on the signal line a the time the sample is taken. In response to an indication of the number of binary value transitions in the several bit binary word an indication of the noise content of the data bit is derived.

The above and still further objects, features and advantages of the present invention will become apparent upon consideration of the following detailed description of several specific embodiments thereof, especially when taken in conjunction with the accompanying drawings.

DESCRIPTION OF THE PREFERRED EMBODIMENT

Figure 1:
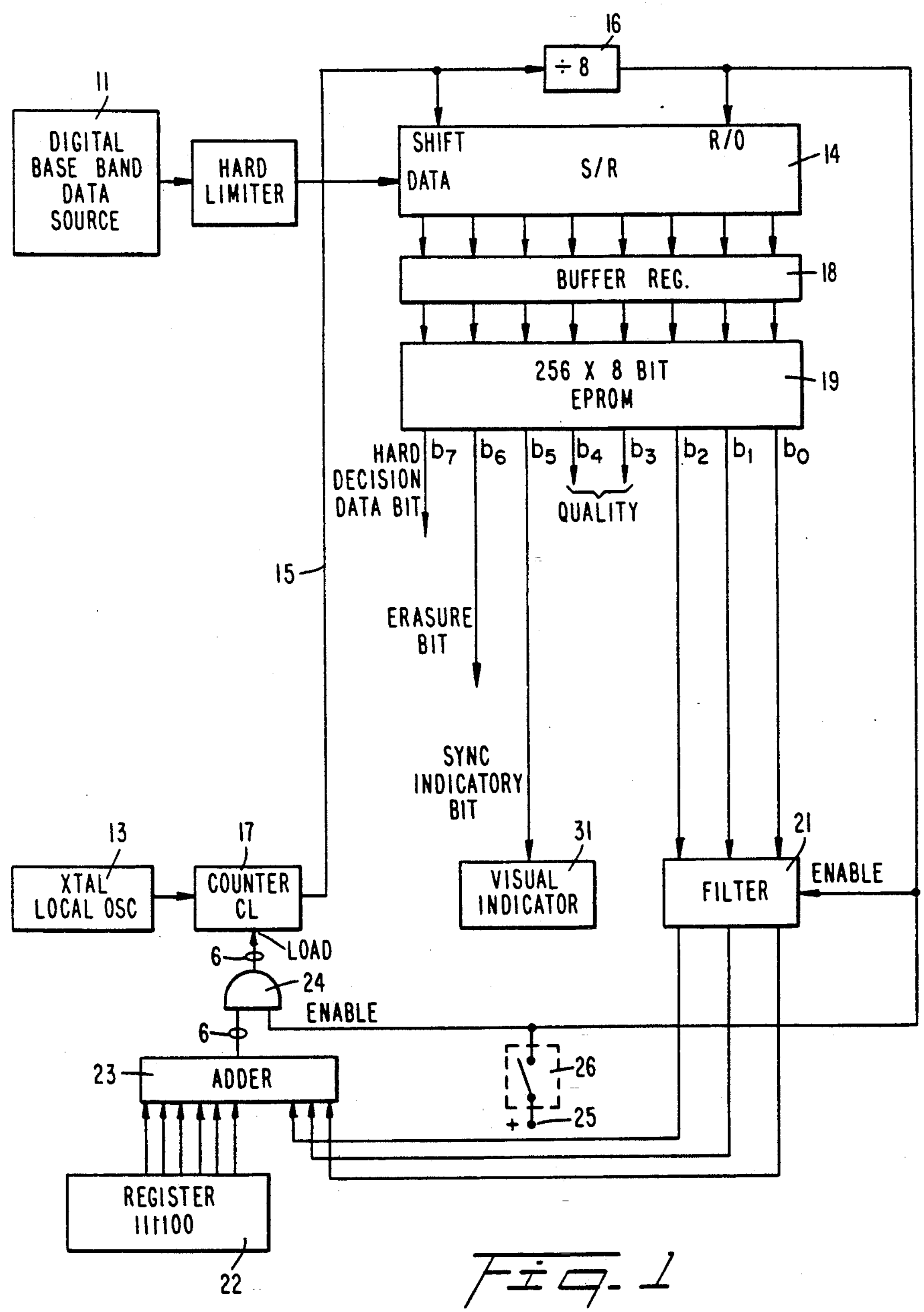
FIG. 1 is a block diagram of a preferred embodiment of a synchronizer for a local oscillator in accordance with a preferred embodiment of the invention.

Reference is now made to FIG. 1 wherein digital baseband data source 11, such as derived from a radio carrier recovery loop, derives a digital signal that is applied to hard limiter 12. Limiter 12 derives a non-return to zero (NRZ) digital serial data stream having bit values typically representing alpha and numeric values that, in a noiseless transmission link, are replicas of alpha and numeric values derived from a keyboard at a remote transmitter. However, because of noise in the communication link between the transmitter and the receiver of FIG. 1 the signal derived by hard limiter 12 is not, in actuality, a replica of the binary signals at the transmitter.

The apparatus illustrated in FIG. 1 responds to the signal derived by hard limiter 12 to determine the value of each bit in the bit stream and to synchronize the phase of a signal derived from crystal local oscillator 13 to the phase of the output signal of hard limiter 12, despite the fact that there may be substantial noise on the output of the hard limiter. The noise is reflected in transitions in the output of the hard limiter. The transitions typically occur at a frequency greater than the frequency of the binary bits derived from the transmitter; the transitions usually are at intermediate times between the beginning and end of each received bit.

To these ends, the binary value of each received binary bit derived by hard limiter 12 is sampled several times to derive a several bit digital word having a binary value commensurate with the binary value of each sample. In the preferred, specifically described embodiment, each bit derived by limiter 12 is sampled eight times during the bit.

To sample the output of hard limiter 12, the hard limiter output signal is applied to a data input of shift register 14, having a shift input responsive to a clock signal on lead 15. The clock signal on lead 15 is supplied to an enable readout (R/O) input of shift register 14 via divide by eight frequency divider 16. The count stored in shift register 14 is cleared from the shift register shortly after the contents of the shift register are read-out, by circuitry well known to those skilled in the art.

The signal on lead 15 has a frequency eight times that of the bit rate at the output of hard limiter 12, a result achieved by supplying the output of crystal oscillator 13 to a clock input of settable counter 17. Under ideal synchronized conditions, the count of counter 17 is set to a value of 64, to divide by a factor of 64, the frequency of crystal local oscillator 13. Oscillator 13 derives an output that is applied to the clock (CL) input of counter 17. For maximum phase adjustments of the clock signal on lead 15 and the data bits derived from limiter 12, counter 17 is set to a count of 60 or 67. For intermediate phase displacements counter 17 is set to counts of 61, 62, 63, 65 or 66, dependent on the extent of the displacement.

The eight sampled values for each bit at the output of hard limiter 12 are supplied by shift register 14 to buffer register 18. The signal in buffer register 18 addresses erasable programmable read only memory (EPROM) 19.

Memory 19 has an eight bit address input and $2^8=256$ data containing addresses. At each of the 256 addresses of memory 19 is stored a different eight bit data word. Each eight bit data word in memory 19 is arranged as follows:

bits b0, b1, b2 (the three least significant bits) form a three bit subword for control of the phase of the signal supplied to lead 15;

bit b7 is a hard decision data bit to indicate the binary value of each received data bit supplied by hard limiter 12 to shift register 14, as indicated by the eight samples of each received bit;

bits b3 and b4 form a two bit subword representing the "quality" of hard decision data bit b7; bits b3 and b4 can be combined with bit b7 to drive a character decoder;

bit b5 indicates whether the signal on lead 15 is synchronized with the output of hard limiter 12; and bit b6 is an erasure bit representing the noise content of the received data bit that caused memory 19 to be addressed; bit b6 can be combined with hard decision data bit b7 to drive another character decoder.

The 256 addresses in memory 19 are addressed by the eight address bits in register 18, hence, the eight samples of the binary value of the output of hard limiter 12 control which combination of bits b0–b7 is derived on the eight bit output bus of memory 19. The values in memory 19 are arranged to compensate for noise in the output of hard limiter 12 during each data bit.

If the sampled values in register 18 that address memory 19 provide a clear indication of the value of the data bit derived by hard limiter 12, quality bits b3 and b4 have binary values of one and one, respectively, while erasure bit b6 has a value of zero. The highest quality, i.e., lowest noise level, of the output of hard limiter 12 is associated with an output of the limiter having no or only one transition during the eight samples. In contrast, if there is a high degree of noise in the output of hard limiter 12, such that, for example, seven transitions occur in the eight samples of the limiter output during a received bit, such a received data bit has the poorest quality, indicated by bits b3 and b4 both having binary zero values and erasure bit b6 having a binary one value. For intermediate noise levels, wherein there are between two and six transitions in the output of hard limiter 12, quality bits b3 and b4 have values commensurate with the number of transitions. In certain instances, erasure bit b6 has a binary zero value to indicate that the binary one or zero value associated with hard decision data bit b7 has a high degree of certainty of being accurate, and in other instances a binary one value to indicate that the value of hard decision data bit b7 is of questionable certainty.

The algorithm for constructing the binary value at each of the 256 addresses in memory 19 involves mapping the eight samples for each data bit at the output of hard limiter 12 into a theoretical value for the samples forming a single data bit. From this theoretical value, the values of bits b0–b7 are determined. The algorithm, based on the transmission properties of the communication link between the transmitter and receiver, is designed to avoid ambiguity. The algorithm for one particular situation is indicated on enclosed Table I.

TABLE I

| RCVD SAMPLE | | | | | EPROM 19 OUTPUT b7.....b0 |
|---|---|---|---|---|---|
| 00000000 | MAPS | TO | 00000000 | SO LOOKUP | 00111100 |
| 00000001 | MAPS | TO | 00000001 | SO LOOKUP | 00111011 |
| 00000010 | MAPS | TO | 00000001 | SO LOOKUP | 00110100 |
| 00000011 | MAPS | TO | 00000011 | SO LOOKUP | 00011010 |
| 00000100 | MAPS | TO | 00000001 | SO LOOKUP | 00110100 |
| 00000101 | MAPS | TO | 00000011 | SO LOOKUP | 00010011 |
| 00000110 | MAPS | TO | 00000011 | SO LOOKUP | 00010011 |
| 00000111 | MAPS | TO | 00000111 | SO LOOKUP | 00011001 |
| 00001000 | MAPS | TO | 00000011 | SO LOOKUP | 01001100 |
| 00001001 | MAPS | TO | 00000011 | SO LOOKUP | 00010011 |
| 00001010 | MAPS | TO | 00000011 | SO LOOKUP | 01001100 |
| 00001011 | MAPS | TO | 00000111 | SO LOOKUP | 00010011 |
| 00001100 | MAPS | TO | 00000011 | SO LOOKUP | 01001100 |
| 00001101 | MAPS | TO | 00000111 | SO LOOKUP | 00010011 |
| 00001110 | MAPS | TO | 00000011 | SO LOOKUP | 01001100 |
| 00001111 | MAPS | TO | 00001111 | SO LOOKUP | 00011000 |
| 00010000 | MAPS | TO | 11000000 | SO LOOKUP | 01001100 |
| 00010001 | MAPS | TO | 00000111 | SO LOOKUP | 01001100 |
| 00010010 | MAPS | TO | 00000011 | SO LOOKUP | 01000100 |
| 00010011 | MAPS | TO | 00000111 | SO LOOKUP | 00010011 |
| 00010100 | MAPS | TO | 00000011 | SO LOOKUP | 01000100 |
| 00010101 | MAPS | TO | 00000111 | SO LOOKUP | 01001100 |
| 00010110 | MAPS | TO | 00000111 | SO LOOKUP | 01000100 |
| 00010111 | MAPS | TO | 00001111 | SO LOOKUP | 00010010 |

TABLE I (cont'd)

| RCVD SAMPLE | | | | | EPROM 19 OUTPUT b7.....b0 |
|---|---|---|---|---|---|
| 00011000 | MAPS TO | 00000011 | SO | LOOKUP | 01000100 |
| 00011001 | MAPS TO | 00000111 | SO | LOOKUP | 01001100 |
| 00011010 | MAPS TO | 00000111 | SO | LOOKUP | 01000100 |
| 00011011 | MAPS TO | 00001111 | SO | LOOKUP | 00010010 |
| 00011100 | MAPS TO | 00000111 | SO | LOOKUP | 01000100 |
| 00011101 | MAPS TO | 00000111 | SO | LOOKUP | 01001100 |
| 00011110 | MAPS TO | 01111111 | SO | LOOKUP | 11101100 |
| 00011111 | MAPS TO | 00011111 | SO | LOOKUP | 10011111 |
| 00100000 | MAPS TO | 10000000 | SO | LOOKUP | 00110100 |
| 00100001 | MAPS TO | 10000000 | SO | LOOKUP | 01101100 |
| 00100010 | MAPS TO | 00000000 | SO | LOOKUP | 01100100 |
| 00100011 | MAPS TO | 00001111 | SO | LOOKUP | 01001011 |
| 00100100 | MAPS TO | 00000000 | SO | LOOKUP | 01100100 |
| 00100101 | MAPS TO | 00000111 | SO | LOOKUP | 01000100 |
| 00100110 | MAPS TO | 00000111 | SO | LOOKUP | 01000100 |
| 00100111 | MAPS TO | 00001111 | SO | LOOKUP | 00010010 |
| 00101000 | MAPS TO | 11000000 | SO | LOOKUP | 01000100 |
| 00101001 | MAPS TO | 00000111 | SO | LOOKUP | 01000100 |
| 00101010 | MAPS TO | 00000111 | SO | LOOKUP | 01000100 |
| 00101011 | MAPS TO | 00001111 | SO | LOOKUP | 01001011 |
| 00101100 | MAPS TO | 00000111 | SO | LOOKUP | 01000100 |
| 00101101 | MAPS TO | 00001111 | SO | LOOKUP | 01000100 |
| 00101110 | MAPS TO | 00111111 | SO | LOOKUP | 11000100 |
| 00101111 | MAPS TO | 00011111 | SO | LOOKUP | 10010101 |
| 00110000 | MAPS TO | 11000000 | SO | LOOKUP | 01001100 |
| 00110001 | MAPS TO | 00000111 | SO | LOOKUP | 01000100 |
| 00110010 | MAPS TO | 00000111 | SO | LOOKUP | 01000100 |
| 00110011 | MAPS TO | 00001111 | SO | LOOKUP | 01001011 |
| 00110100 | MAPS TO | 11111110 | SO | LOOKUP | 11100100 |
| 00110101 | MAPS TO | 00001111 | SO | LOOKUP | 01000100 |
| 00110110 | MAPS TO | 00111111 | SO | LOOKUP | 11000100 |
| 00110111 | MAPS TO | 00011111 | SO | LOOKUP | 10010101 |
| 00111000 | MAPS TO | 11111110 | SO | LOOKUP | 11100100 |
| 00111001 | MAPS TO | 00001111 | SO | LOOKUP | 01000100 |
| 00111010 | MAPS TO | 11111111 | SO | LOOKUP | 11100100 |
| 00111011 | MAPS TO | 00001111 | SO | LOOKUP | 01001011 |
| 00111100 | MAPS TO | 11111111 | SO | LOOKUP | 11101100 |
| 00111101 | MAPS TO | 11111111 | SO | LOOKUP | 11101100 |
| 00111110 | MAPS TO | 01111111 | SO | LOOKUP | 10110100 |
| 00111111 | MAPS TO | 00111111 | SO | LOOKUP | 10011110 |
| 01000000 | MAPS TO | 10000000 | SO | LOOKUP | 00110100 |
| 01000001 | MAPS TO | 00000000 | SO | LOOKUP | 00110100 |
| 01000010 | MAPS TO | 00000000 | SO | LOOKUP | 01101100 |
| 01000011 | MAPS TO | 00000000 | SO | LOOKUP | 01101100 |
| 01000100 | MAPS TO | 00000000 | SO | LOOKUP | 01100100 |
| 01000101 | MAPS TO | 00000001 | SO | LOOKUP | 01100100 |
| 01000110 | MAPS TO | 00000001 | SO | LOOKUP | 01100100 |
| 01000111 | MAPS TO | 00011111 | SO | LOOKUP | 11001100 |
| 01001000 | MAPS TO | 11000000 | SO | LOOKUP | 01000100 |
| 01001001 | MAPS TO | 00000001 | SO | LOOKUP | 01100100 |

TABLE I (cont'd)

| RCVD SAMPLE | | | | | | EPROM 19 OUTPUT b7.....b0 |
|---|---|---|---|---|---|---|
| 01001010 | MAPS | TO | 00000001 | SO | LOOKUP | 01100100 |
| 01001011 | MAPS | TO | 00001111 | SO | LOOKUP | 01000100 |
| 01001100 | MAPS | TO | 00000001 | SO | LOOKUP | 01100100 |
| 01001101 | MAPS | TO | 00001111 | SO | LOOKUP | 01000100 |
| 01001110 | MAPS | TO | 00111111 | SO | LOOKUP | 11000100 |
| 01001111 | MAPS | TO | 00011111 | SO | LOOKUP | 10010101 |
| 01010000 | MAPS | TO | 11000000 | SO | LOOKUP | 01001100 |
| 01010001 | MAPS | TO | 10000000 | SO | LOOKUP | 01100100 |
| 01010010 | MAPS | TO | 10000000 | SO | LOOKUP | 01100100 |
| 01010011 | MAPS | TO | 00001111 | SO | LOOKUP | 01000100 |
| 01010100 | MAPS | TO | 11100000 | SO | LOOKUP | 01000100 |
| 01010101 | MAPS | TO | 00001111 | SO | LOOKUP | 01000100 |
| 01010110 | MAPS | TO | 00111111 | SO | LOOKUP | 11000100 |
| 01010111 | MAPS | TO | 00011111 | SO | LOOKUP | 11001100 |
| 01011000 | MAPS | TO | 11100000 | SO | LOOKUP | 01000100 |
| 01011001 | MAPS | TO | 00001111 | SO | LOOKUP | 01000100 |
| 01011010 | MAPS | TO | 11111111 | SO | LOOKUP | 11100100 |
| 01011011 | MAPS | TO | 00011111 | SO | LOOKUP | 11000100 |
| 01011100 | MAPS | TO | 11111111 | SO | LOOKUP | 11100100 |
| 01011101 | MAPS | TO | 01111111 | SO | LOOKUP | 11100100 |
| 01011110 | MAPS | TO | 01111111 | SO | LOOKUP | 11101100 |
| 01011111 | MAPS | TO | 00111111 | SO | LOOKUP | 10010101 |
| 01100000 | MAPS | TO | 11000000 | SO | LOOKUP | 00010101 |
| 01100001 | MAPS | TO | 10000000 | SO | LOOKUP | 01101100 |
| 01100010 | MAPS | TO | 10000000 | SO | LOOKUP | 01100100 |
| 01100011 | MAPS | TO | 00001111 | SO | LOOKUP | 01000100 |
| 01100100 | MAPS | TO | 11100000 | SO | LOOKUP | 01000100 |
| 01100101 | MAPS | TO | 00001111 | SO | LOOKUP | 01000100 |
| 01100110 | MAPS | TO | 00111111 | SO | LOOKUP | 11000100 |
| 01100111 | MAPS | TO | 00011111 | SO | LOOKUP | 11001100 |
| 01101000 | MAPS | TO | 11100000 | SO | LOOKUP | 01000100 |
| 01101001 | MAPS | TO | 11111100 | SO | LOOKUP | 11000100 |
| 01101010 | MAPS | TO | 11111100 | SO | LOOKUP | 11000100 |
| 01101011 | MAPS | TO | 00011111 | SO | LOOKUP | 11000100 |
| 01101100 | MAPS | TO | 11111100 | SO | LOOKUP | 11000100 |
| 01101101 | MAPS | TO | 01111111 | SO | LOOKUP | 11100100 |
| 01101110 | MAPS | TO | 01111111 | SO | LOOKUP | 11100100 |
| 01101111 | MAPS | TO | 00111111 | SO | LOOKUP | 10010101 |
| 01110000 | MAPS | TO | 11000000 | SO | LOOKUP | 01001100 |
| 01110001 | MAPS | TO | 11111100 | SO | LOOKUP | 11000100 |
| 01110010 | MAPS | TO | 11111100 | SO | LOOKUP | 11000100 |
| 01110011 | MAPS | TO | 00011111 | SO | LOOKUP | 11000100 |
| 01110100 | MAPS | TO | 11111100 | SO | LOOKUP | 11000100 |
| 01110101 | MAPS | TO | 11111110 | SO | LOOKUP | 11100100 |
| 01110110 | MAPS | TO | 11111110 | SO | LOOKUP | 11100100 |
| 01110111 | MAPS | TO | 00011111 | SO | LOOKUP | 11001100 |
| 01111000 | MAPS | TO | 11111110 | SO | LOOKUP | 11101100 |
| 01111001 | MAPS | TO | 11111110 | SO | LOOKUP | 11101100 |
| 01111010 | MAPS | TO | 11111110 | SO | LOOKUP | 11101100 |
| 01111011 | MAPS | TO | 11111110 | SO | LOOKUP | 11101100 |

TABLE I (cont'd)

| RCVD SAMPLE | | | | | | EPROM 19 OUTPUT b7.....b0 |
|---|---|---|---|---|---|---|
| 01111100 | MAPS | TO | 11111110 | SO | LOOKUP | 10110100 |
| 01111101 | MAPS | TO | 11111111 | SO | LOOKUP | 10110100 |
| 01111110 | MAPS | TO | 11111111 | SO | LOOKUP | 10110100 |
| 01111111 | MAPS | TO | 01111111 | SO | LOOKUP | 10111101 |
| 10000000 | MAPS | TO | 10000000 | SO | LOOKUP | 00111101 |
| 10000001 | MAPS | TO | 00000000 | SO | LOOKUP | 00110100 |
| 10000010 | MAPS | TO | 00000000 | SO | LOOKUP | 00110100 |
| 10000011 | MAPS | TO | 00000001 | SO | LOOKUP | 00110100 |
| 10000100 | MAPS | TO | 00000001 | SO | LOOKUP | 01101100 |
| 10000101 | MAPS | TO | 00000001 | SO | LOOKUP | 01101100 |
| 10000110 | MAPS | TO | 00000001 | SO | LOOKUP | 01101100 |
| 10000111 | MAPS | TO | 00000001 | SO | LOOKUP | 01101100 |
| 10001000 | MAPS | TO | 11100000 | SO | LOOKUP | 01001100 |
| 10001001 | MAPS | TO | 00000001 | SO | LOOKUP | 01100100 |
| 10001010 | MAPS | TO | 00000001 | SO | LOOKUP | 01100100 |
| 10001011 | MAPS | TO | 00000011 | SO | LOOKUP | 01000100 |
| 10001100 | MAPS | TO | 00000001 | SO | LOOKUP | 01100100 |
| 10001101 | MAPS | TO | 00000011 | SO | LOOKUP | 01000100 |
| 10001110 | MAPS | TO | 00000011 | SO | LOOKUP | 01000100 |
| 10001111 | MAPS | TO | 00111111 | SO | LOOKUP | 11001100 |
| 10010000 | MAPS | TO | 11000000 | SO | LOOKUP | 00010101 |
| 10010001 | MAPS | TO | 10000000 | SO | LOOKUP | 01100100 |
| 10010010 | MAPS | TO | 10000000 | SO | LOOKUP | 01100100 |
| 10010011 | MAPS | TO | 00000011 | SO | LOOKUP | 01000100 |
| 10010100 | MAPS | TO | 11100000 | SO | LOOKUP | 01000100 |
| 10010101 | MAPS | TO | 00000011 | SO | LOOKUP | 01000100 |
| 10010110 | MAPS | TO | 00000011 | SO | LOOKUP | 01000100 |
| 10010111 | MAPS | TO | 00011111 | SO | LOOKUP | 11000100 |
| 10011000 | MAPS | TO | 11100000 | SO | LOOKUP | 01001100 |
| 10011001 | MAPS | TO | 00000011 | SO | LOOKUP | 01000100 |
| 10011010 | MAPS | TO | 11111111 | SO | LOOKUP | 11100100 |
| 10011011 | MAPS | TO | 00011111 | SO | LOOKUP | 11000100 |
| 10011100 | MAPS | TO | 11111111 | SO | LOOKUP | 11100100 |
| 10011101 | MAPS | TO | 01111111 | SO | LOOKUP | 11100100 |
| 10011110 | MAPS | TO | 01111111 | SO | LOOKUP | 11101100 |
| 10011111 | MAPS | TO | 00111111 | SO | LOOKUP | 10010101 |
| 10100000 | MAPS | TO | 11000000 | SO | LOOKUP | 00010101 |
| 10100001 | MAPS | TO | 10000000 | SO | LOOKUP | 01101100 |
| 10100010 | MAPS | TO | 10000000 | SO | LOOKUP | 01100100 |
| 10100011 | MAPS | TO | 00000000 | SO | LOOKUP | 01100100 |
| 10100100 | MAPS | TO | 11100000 | SO | LOOKUP | 01000100 |
| 10100101 | MAPS | TO | 00000000 | SO | LOOKUP | 01100100 |
| 10100110 | MAPS | TO | 11110000 | SO | LOOKUP | 11000100 |
| 10100111 | MAPS | TO | 00011111 | SO | LOOKUP | 11000100 |
| 10101000 | MAPS | TO | 11100000 | SO | LOOKUP | 01001100 |
| 10101001 | MAPS | TO | 11000000 | SO | LOOKUP | 01000100 |
| 10101010 | MAPS | TO | 11110000 | SO | LOOKUP | 11000100 |
| 10101011 | MAPS | TO | 00011111 | SO | LOOKUP | 11000100 |
| 10101100 | MAPS | TO | 11110000 | SO | LOOKUP | 11000100 |
| 10101101 | MAPS | TO | 01111111 | SO | LOOKUP | 11100100 |
| 10101110 | MAPS | TO | 01111111 | SO | LOOKUP | 11100100 |
| 10101111 | MAPS | TO | 00111111 | SO | LOOKUP | 11001100 |

TABLE I (cont'd)

| RCVD SAMPLE | | | | | EPROM 19 OUTPUT b7.....b0 |
|---|---|---|---|---|---|
| 10110000 | MAPS TO | 11100000 | SO | LOOKUP | 00010101 |
| 10110001 | MAPS TO | 11000000 | SO | LOOKUP | 01000100 |
| 10110010 | MAPS TO | 11110000 | SO | LOOKUP | 11000100 |
| 10110011 | MAPS TO | 00011111 | SO | LOOKUP | 11000100 |
| 10110100 | MAPS TO | 11110000 | SO | LOOKUP | 11000100 |
| 10110101 | MAPS TO | 11111110 | SO | LOOKUP | 11100100 |
| 10110110 | MAPS TO | 11111110 | SO | LOOKUP | 11100100 |
| 10110111 | MAPS TO | 00111111 | SO | LOOKUP | 11000100 |
| 10111000 | MAPS TO | 11100000 | SO | LOOKUP | 01001100 |
| 10111001 | MAPS TO | 11111110 | SO | LOOKUP | 11100100 |
| 10111010 | MAPS TO | 11111110 | SO | LOOKUP | 11100100 |
| 10111011 | MAPS TO | 11111111 | SO | LOOKUP | 11100100 |
| 10111100 | MAPS TO | 11111111 | SO | LOOKUP | 11101100 |
| 10111101 | MAPS TO | 11111111 | SO | LOOKUP | 11101100 |
| 10111110 | MAPS TO | 11111111 | SO | LOOKUP | 10110100 |
| 10111111 | MAPS TO | 01111111 | SO | LOOKUP | 10110100 |
| 11000000 | MAPS TO | 11000000 | SO | LOOKUP | 00011110 |
| 11000001 | MAPS TO | 10000000 | SO | LOOKUP | 00110100 |
| 11000010 | MAPS TO | 00000000 | SO | LOOKUP | 01101100 |
| 11000011 | MAPS TO | 00000000 | SO | LOOKUP | 01101100 |
| 11000100 | MAPS TO | 11110000 | SO | LOOKUP | 11001011 |
| 11000101 | MAPS TO | 00000000 | SO | LOOKUP | 01100100 |
| 11000110 | MAPS TO | 11110000 | SO | LOOKUP | 11000100 |
| 11000111 | MAPS TO | 00000001 | SO | LOOKUP | 01100100 |
| 11001000 | MAPS TO | 11100000 | SO | LOOKUP | 00010101 |
| 11001001 | MAPS TO | 11000000 | SO | LOOKUP | 01000100 |
| 11001010 | MAPS TO | 11110000 | SO | LOOKUP | 11000100 |
| 11001011 | MAPS TO | 00000001 | SO | LOOKUP | 01100100 |
| 11001100 | MAPS TO | 11110000 | SO | LOOKUP | 11001011 |
| 11001101 | MAPS TO | 01111111 | SO | LOOKUP | 11100100 |
| 11001110 | MAPS TO | 01111111 | SO | LOOKUP | 11100100 |
| 11001111 | MAPS TO | 00111111 | SO | LOOKUP | 11001100 |
| 11010000 | MAPS TO | 11100000 | SO | LOOKUP | 00010101 |
| 11010001 | MAPS TO | 11000000 | SO | LOOKUP | 01000100 |
| 11010010 | MAPS TO | 11110000 | SO | LOOKUP | 11000100 |
| 11010011 | MAPS TO | 11111000 | SO | LOOKUP | 11000100 |
| 11010100 | MAPS TO | 11110000 | SO | LOOKUP | 11001011 |
| 11010101 | MAPS TO | 11111000 | SO | LOOKUP | 11000100 |
| 11010110 | MAPS TO | 11111000 | SO | LOOKUP | 11000100 |
| 11010111 | MAPS TO | 00111111 | SO | LOOKUP | 11000100 |
| 11011000 | MAPS TO | 11110000 | SO | LOOKUP | 10010010 |
| 11011001 | MAPS TO | 11111000 | SO | LOOKUP | 11000100 |
| 11011010 | MAPS TO | 11111000 | SO | LOOKUP | 11000100 |
| 11011011 | MAPS TO | 11111111 | SO | LOOKUP | 11100100 |
| 11011100 | MAPS TO | 11110000 | SO | LOOKUP | 11001011 |
| 11011101 | MAPS TO | 11111111 | SO | LOOKUP | 11100100 |
| 11011110 | MAPS TO | 01111111 | SO | LOOKUP | 11101100 |
| 11011111 | MAPS TO | 01111111 | SO | LOOKUP | 10110100 |
| 11100000 | MAPS TO | 11100000 | SO | LOOKUP | 00011111 |
| 11100001 | MAPS TO | 10000000 | SO | LOOKUP | 01101100 |

```
11100010 MAPS TO 11111000 SO LOOKUP 11001100
11100011 MAPS TO 11111000 SO LOOKUP 11000100
11100100 MAPS TO 11110000 SO LOOKUP 10010010
11100101 MAPS TO 11111000 SO LOOKUP 11000100
11100110 MAPS TO 11111000 SO LOOKUP 11001100
11100111 MAPS TO 00111111 SO LOOKUP 11000100
11101000 MAPS TO 11110000 SO LOOKUP 10010010
11101001 MAPS TO 11111000 SO LOOKUP 11000100
11101010 MAPS TO 11111000 SO LOOKUP 11001100
11101011 MAPS TO 11111100 SO LOOKUP 11000100
11101100 MAPS TO 11111000 SO LOOKUP 10010011
11101101 MAPS TO 11111100 SO LOOKUP 11000100
11101110 MAPS TO 11111000 SO LOOKUP 11001100
11101111 MAPS TO 00111111 SO LOOKUP 11001100
11110000 MAPS TO 11110000 SO LOOKUP 10011000
11110001 MAPS TO 11111100 SO LOOKUP 11001100
11110010 MAPS TO 11111000 SO LOOKUP 10010011
11110011 MAPS TO 11111100 SO LOOKUP 11001100
11110100 MAPS TO 11111000 SO LOOKUP 10010011
11110101 MAPS TO 11111100 SO LOOKUP 11001100
11110110 MAPS TO 11111100 SO LOOKUP 10010011
11110111 MAPS TO 11111100 SO LOOKUP 11001100
11111000 MAPS TO 11111000 SO LOOKUP 10011001
11111001 MAPS TO 11111100 SO LOOKUP 10010011
11111010 MAPS TO 11111100 SO LOOKUP 10010011
11111011 MAPS TO 11111110 SO LOOKUP 10110100
11111100 MAPS TO 11111100 SO LOOKUP 10011010
11111101 MAPS TO 11111110 SO LOOKUP 10110100
11111110 MAPS TO 11111110 SO LOOKUP 10111011
11111111 MAPS TO 11111111 SO LOOKUP 10111100
```

The first (left hand) column in each row of eight binary zero and one values in Table I indicates the values of the eight samples stored in shift register 14 for a received data bit derived from hard limiter 12. The second (center) column of eight bits in Table I indicates the theoretical eight bit word into which the received word on the same row is mapped or transformed. Only one binary value transition occurs for each word of the second column. The third (right hand) column of eight binary ones and zeros in Table I indicates the values of bits b7–b0 readout from memory 19 for the sequence in the first column.

If the samples stored in shift register 14 for an output bit of hard limiter 12 have the values: 00000000, bits b7–b0 respectively have values of 00111100. The zero value for bit b7 indicates that the hard decision data bit has a value of zero. The zero value for erasure bit b6 indicates that there is a high degree of confidence of bit b7 being a zero data bit. The one value for bit b5 indicates that the bit derived from hard limiter 12 is synchronized with the clock signal on lead 15. The one, one values for bits b4 and b3 indicate a very high quality received signal and that hard decision data bit b7 should not be changed by a decoder. The one, zero, zero values for bits b2, b1 and b0, respectively indicate that the count of counter 17 should be set to a value of 64, to synchronize the clock signal on lead 15 with the output of hard limiter 12.

In contrast, if the eight samples stored in shift register 14 have values of 01010101 no meaningful data concerning the received data word can be derived from these samples. An arbitrary value of zero is assigned to hard decision bit b7 under these circumstances and the phase of the clock signal on lead 15 is maintained at a nominal median position, as indicated by the values of one, zero, zero for bits b2, b1 and b0; these values for bits b2, b1 and b0 cause counter 17 to be set to a count of 64. Erasure bit b6 has a binary one value under these circumstances, to indicate that the hard decision data bit b7 should be changed by a character decoder if the decoder detects an erroneous character. Synchronization indicator bit b6 has a binary value of zero to indicate that no synchronization exists between the clock signal on lead 15 and the output of hard limiter 12. Quality bits b4 and b3 have values of zero, zero to indicate that the confidence level of the binary zero value of hard decision bit b7 is the lowest possible value.

Next consider the situation wherein the output of hard limiter 12 has one transition during a binary bit, at a sample between the first and second samples. Such a situation is illustrated by the sequence 00000001 in the first column at the second row of Table I. Such a sequence occurs in response to a noiseless communication link while there is a one sample displacement between the phase of the output of hard limiter 12 and the clock signal on lead 15. In such a situation, at the 00000001 address in memory 19 is stored the sequence 00111011. The zero value of bit b7 indicates that the hard decision data bit has a value of zero, as would be expected in a sequence wherein seven binary zeros are followed by a single binary one. Erasure bit b6 has a value of zero to indicate that the confidence level of hard decision data bit b7 is high.

Sync indicator bit b5 has a one value to indicate synchronization between the signal on lead 15 and the output of hard limiter 12. Sync indicator bit b6 has a binary one value, to indicate synchronization in response to all eight samples in shift register 14 having the same value or in response to the eight samples in the shift register mapping into a sequence of eight binary bits having a single transition between the first and second bits and/or between the seventh and eighth bits, i.e., a transition between bits b6 and b7 and/or a transition between bits b0 and b1. Sync indicator bit b6 has a binary one value in response to these combinations because of the likelihood of slight jitter between the data bits derived by hard limiter 12 and the clock signal on lead 15. Typically, visual indicator 20, including an LED, is activated to an "on" state in response to sync indicator bit b5 having a binary one value. Because of the high probability of jitter between the output of hard limiter 12 and the clock signal on lead 15, an operator of the receiver illustrated in FIG. 1 is provided with a constant visual indication, rather than an intermittent jitter type indication, when synchronization has been achieved.

Bits b4 and b3 both have values of one to indicate the highest quality or highest confidence level in the binary zero value of hard decision bit b7. Phase control bits b2, b1 and b0 have values of zero, one, one, indicating that the count of counter 17 should be set at 63. Thereby when the next data bit is derived from hard limiter 12, clock source 15 is synchronized to the transitions of the hard limiter so that, for example, if the hard limiter is deriving a binary zero value in a noiseless transition medium, a binary zero value is stored in each of the eight stages of shift register 14.

Next assume that due to noise, the eight samples stored in shift register 14 for the output of hard limiter 12 have values of 00000010 as indicated by the address in the first column and the third row of Table I. These sample values are mapped, in accordance with the algorithm, into a mapped binary word 00000001, as indicated by the center column, third row of Table I. At the address assigned to 00000010 are stored the binary values 00110100, as indicated by the third row, right column of Table I. The hard decision data bit b7 thus has a value of zero, as is expected for a received binary bit having seven out of eight samples with a binary zero value. There is a relatively high degree of confidence in the binary zero value of bit b7, whereby erasure bit b6 has a binary zero value. Since the value of 00000010 maps to 00000001, sync indicator bit b5 has a binary one value to indicate synchronization. Quality bits b4 and b3, however, respectively have values of one, zero to indicate that the confidence in hard decision data bit b7 being a binary zero is not as great as for the received samples having values of 00000000 and 00000001. Because of the high probability of the transition in the 00000010 samples being due to noise, counter 17 is set to the nominal value of 64.

Phase control bits b0-b2 are programmed for one transition of the eight samples in shift register 14 as set forth in Table II.

TABLE II

| SINGLE TRANSITION BETWEEN SAMPLES | DESIRED COUNT OF COUNTER 17 | VALUE OF BITS | | |
|---|---|---|---|---|
| | | b2 | b1 | b0 |
| S0-S1 | 63 | 0 | 1 | 1 |
| S1-S2 | 62 | 0 | 1 | 0 |
| S2-S3 | 61 | 0 | 0 | 1 |
| S3-S4 | 60 | 0 | 0 | 0 |
| S4-S5 | 65 | 1 | 0 | 1 |
| S5-S6 | 66 | 1 | 1 | 0 |
| S6-S7 | 67 | 1 | 1 | 1 |

If there is exact synchronization between the signal on lead 15 and the output of hard limiter 12, whereby all of the bits in shift register 14 are either binary zero or binary one, bits b2, b1 and b0 have values of one, zero, zero. Bits b0-b2, selectively representing values of 0-7, are added to a binary value representing the numerical value 60, i.e., 11100, to control the count stored in counter 17.

If there is more than one binary zero to one or binary one to zero transition of the samples stored in shift register 14, the values of b0-b2 for the corresponding address in memory 19 are determined by the position of the transition of the mapped word in the second column of Table I and the noise level of the samples in the shift register, based on empirical data. For example, counter 17 is set to a nominal value of 64 for the bit sequence 00000010, having two binary zero to binary one and binary one to binary zero transitions, even though that sequence is mapped into the sequence 00000001. Hence, for control of the clock signal on lead 15, sample sequence 00000010 maps into 00000001.

Sample sequence 00011010, which maps to 00000111, is considered to be so noise-laden that the nominal 64 count is also stored in counter 17. In contrast, sample sequence 00100011 which maps into the sequence 00001111, causes the values of bits b2, b1and b0 to be respectively zero, one, one, associated with a count of 63 in counter 17. The count of 63 in counter 17 causes a slight phase advance of the clock signal on lead 15 relative to the nominal phase of the clock signal on lead 15 as a result of the stated combination. This slight change results from a combination of quality bits b3 and b4 respectively having zero, one values, to indicate a relatively low quality, and the transition of the mapped sequence at sample positions S3 and S4, as indicated by the second column of Table I at address 00100011.

An inspection of Table I reveals that a zero quality level for the samples in register 14 results in values of one, zero, zero for bits b2, b1and b0, respectively, whereby no change in the nominal 64 count stored in counter 17 occurs. In essence, the values of bits b2-b0 are the product of the quality bits and the mapped word of the second column of Table I. If such a product indicates that no change should be made in the nominal value of the count in counter 17, bits b2, b1 and b0 respectfully have values of one, zero, zero. If the product indicates that there should be a slight change in the nominal value from 64 to 63 or 65, the values of bits b2, b1 and b0 are respectively either zero, one, one or one, zero, one. If the product indicates that there should be a greater change in the phase of the signal on lead 15 relative to the phase of the output of hard limiter 12, the values of bits b2, b1and b0 are respectively either zero, one, zero or one, one, zero. If the product indicates even a greater phase shift is appropriate, the values of bits b2, b1and b0 are either zero, zero, one or one, zero, one. There are only two sample sequences which result in bits b2, b1and b0 having values of zero zero, zero, namely 00001111 and 11110000. These two sequences indicate that there is only one transition in the sample sequence, indicating no appreciable noise in the transmission link, and a transition between samples S3 and S4, i.e., the fourth and fifth samples. Both of these sequences have the maximum quality factor of one, one and map into the same second column sequences of Table I as the values of the samples themselves.

With counter 17 set at its nominal value of 64, the counter responds to local oscillator 13 to derive on lead 15 eight equally spaced positive going transitions during each binary output bit of hard limiter 12. These positive transitions are coupled to the shift input of shift register 14 so that the output of hard limiter 12 is effectively sampled each time a positive going transition occurs in the output of counter 17. If exact synchronization and phase lock have been achieved between the output of hard limiter 12 and the clock signal on lead 15, one out of every eight transitions on lead 15 occurs simultaneously with the beginning and end of each data output bit of the limiter. If counter 17 is loaded with a count of 63, the clock signal on lead 15 is shifted by one-eighth of the duration of each sample stored in shift register 14 for each data bit at the output of limiter 12. If the count stored in counter 17 has a value of 60, the clock signal on lead 15 is shifted by one-half of one sample over the duration of one data bit derived from limiter 12. Hence, in the particular embodiment described in connection with FIG. 1, there is a relatively low rate of change of the clock signal on lead 15 relative to the phase of the output of hard limiter 12. This low rate is employed because of the expected high noise level in the communication link between the transmitter and the receiver of FIG. 1.

For certain purposes it is desirable to reduce the rate at which the phase of the signal on lead 15 can change relative to the output of hard limiter 12. Such a result is provided by filtering or averaging phase control output bits b2, b1and b0 of memory 19. If, however, the noise level of the link between the transmitter and the receiver of FIG. 1 is such that the output of hard limiter 12 has a high signal-to-noise ratio, the phase of the signal on lead 15 can be adjusted much more rapidly. In such a situation, the averaging or filtering process is eliminated and the nominal count of counter 17 is reduced to 16, with range variations from 13 to 20 so there is a one sample shift in the clock for each change of the count stored in the counter.

To control counter 17, the specific embodiment of FIG. 1 includes digital filter or averaging network 21, storage register 22 for storing the binary sequence one, one, one, one, zero, zero (representing the numerical value 60), digital adder 23 and gate 24. Filter 21 is a digital filter having equivalent properties to those of an analog low pass or averaging filter. Filter 21 averages the values of bits b0–b2 at the output of memory 19 over several data bits derived from hard limiter 12. To these ends, filter 21 includes an enable input responsive to divide by eight frequency divider 16, so that filter 21 is enabled synchronously with memory 19. Filter 21 derives a three bit output representative of the average of the phase error indicating output bits b0–b2 of memory 19 over the several bit averaging time of the filter.

The three bit output of filter 21, which represents values from 0–7, is added to the fixed one, one, one, one, zero, zero contents of register 22. The outputs of filter 21 and register 22 are combined in adder 23 which derives a six bit output signal representing decimal values from 60–67. The six bit output signal of adder 23 is applied to gate 24 which is enabled, i.e., opened, in response to the output of divide by eight frequency divider 16. Thereby, the sum indicating output signal of adder 23 is gated through gate 24 once during each received data bit at the output of hard limiter 12.

The six bit signal coupled through gate 24 is applied to a load input of counter 17 to set the state of the counter anywhere between the decimal values of 60–67. During initial conditions counter 17 is loaded with a count of 64, a result achieved by supplying gate 24 with an enable signal in response to initial turn on of the receiver. To this end, the voltage at terminal 25 is coupled through switch 26 to the enable input of gate 24. Switch 26 is momentarily closed in response to manual activation of the receiver on-off switch being activated to the on condition.

The frequency of oscillator 13 and the divide by 64 count of counter 17 cause eight positive going transitions to be applied by counter 17 to lead 15 during each binary bit derived from hard limiter 12. Because the count of counter 17 can vary from 60–67, the relative phase of the clock signal on lead 15 to the phase of the received binary bits derived from hard limiter 12 can change in increments of 1-64th of the duration of each binary bit derived by the hard limiter. Hence, the phase of each sample in shift register 14 can be changed by as little as one-eighth of the duration of each sample or by as much as approximately plus or minus one-half the length of each sample. Accordingly, there is a monotonic response between phase of the clock signal on lead 15 relative to the phase of each data bit derived by hard limiter 12.

Different combinations of bits b7, b6, b4 and b3 can be used to derive character indications. Typically, a character is formed by five or more binary bits, depending on the nature of the code. Certain codes which are used in transmission links having noisy characteristics purposely do not employ all the available combinations of binary ones or zeros. Other code techniques use all of the bit combinations, but employ techniques such that errors can be detected by certain combinations of decoded characters. Such decoding techniques are well known to those skilled in the art and are not elaborated on herein. Certain character decoding techniques employ only the hard decision data bit b7, while other decoding techniques employ hard decision data bit b7 in combination with erasure bit b6, while still other decoding techniques employ hard decision data bit b7 in combination with quality bits b5 and b4. The latter type of decoder is usually referred to as a soft decoder.

Figure 2:
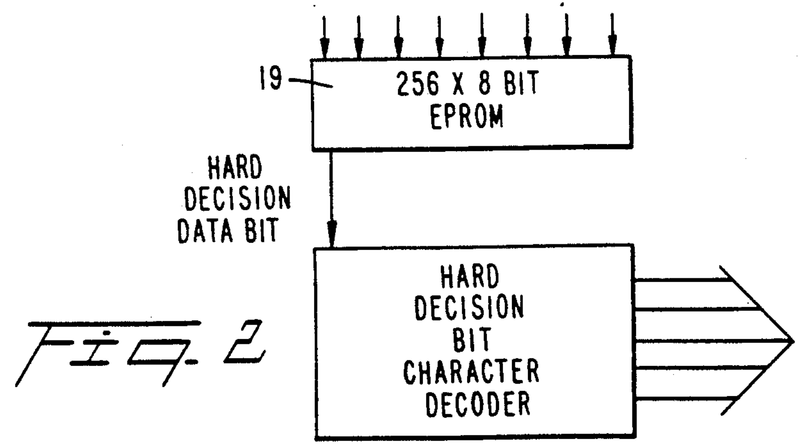
FIG. 2 is a block diagram of an embodiment of a receiver including the synchronizer of FIG. 1, in combination with a decoder that is responsive to a hard decision data bit derived by the apparatus of FIG. 1.

To these ends, decision bit b7 and the output of divide by eight frequency divider 16 are applied to hard decision bit character decoder 31, FIG. 2. In response to a predetermined number of b7 bits being applied to decoder 31, as indicated by the output of frequency divider 16, decoder 31 activates one of multiple output leads. The output lead which is activated depends on the combination of binary ones and zeros supplied by memory 19 over the duration of one character, as indicated by the output of divider 16.

Figure 3:
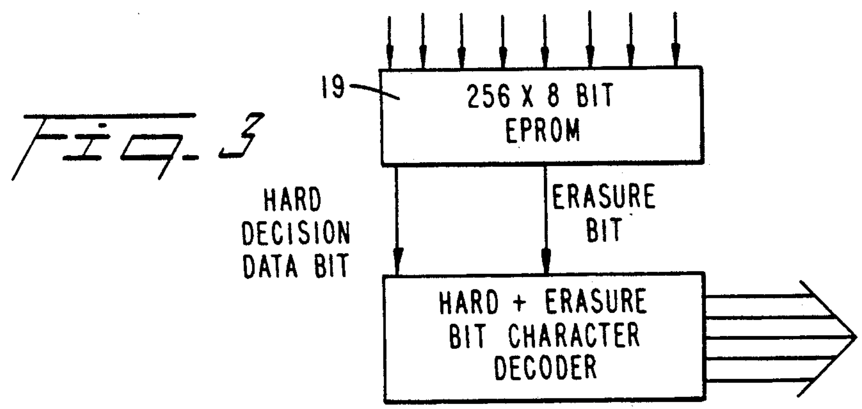
FIG. 3 is a block diagram of a second embodiment of a receiver including the synchronizer of FIG. 1, in combination with a decoder responsive to a hard decision data bit and an erasure bit derived by the apparatus illustrated in FIG. 1.

Erasure bit b6, hard decision data bit b7 and the output of divider 16 are supplied by memory 19 to bit character decoder 32, FIG. 3. Decoder 32 derives an indication of the likely character associated with a sequence of multiple bits supplied by hard limiter 12 to shift register 14. Decoder 32 is arranged so that if the sequence of bits over the character length is not associated with a recognized character, the value of a bit b7 associated with a bit b6 having a binary one value is reversed. In other words, if a character is formed of six bits and the six b7 bits supplied by memory 19 to decoder 32 over the length of a character do not correlate with the value of a bit sequence for a character in the code at the transmitter, a hard decision bit b7 that is accompanied by a binary one value for bit b6 is reversed in value.

Figure 4:
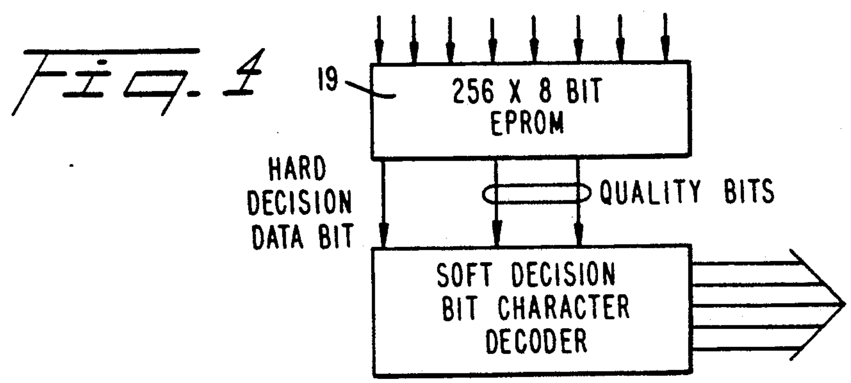
FIG. 4 is a block diagram of a third embodiment of a receiver including the synchronizer of FIG. 1, in combination with a soft decision bit character decoder responsive to a hard decision data bit and a pair of quality bits derived by the apparatus of FIG. 1.

In the decoder FIG. 4, hard decision data bit b7 is combined with quality bits b4 and b5 and with the output of frequency divider 16 in soft decision decoder 33. If a combination of bits decoded by decoder 33 has no assigned character value, data bits in the character are reversed as a function of the value of quality bits b4 and b5 until a valid character is detected. The first bit in the character which is reversed in polarity is the bit having the lowest quality value, as indicated by bits b4 and b5. If the resulting bit combination is not a character code, the polarity of the bit having the next highest quality value is reversed in polarity. The lowest quality value is zero, zero, with progressively increasing quality values of zero, one and one, zero until the highest quality value of one, one is reached.

While there have been described and illustrated several specific embodiments of the invention, it will be clear that variations in the details of the embodiments specifically illustrated and described may be made without departing from the true spirit and scope of the invention as defined in the appended claims. For example, the digital circuitry illustrated in FIGS. 1-4 can be replaced by equivalent processing circuitry in a programmed microprocessor.

We claim:

1. Apparatus for deriving an indication of the amount of noise in a received bit of a digital bit stream comprising means for sampling the binary value of the received bits several predetermined times during of the received bit to derive for the received bit a several bit binary word representing the sampled values, an addressable memory addressed in response to the several derived bits of the received bit, the memory including at each address at least one bit indicative of the noise content of the received bit from which the several bits are derived, the at least one bit having at value determined by the number of transitions in the values of the binary bits forming the numerical value of the address.

2. The apparatus of claim 1 wherein the at least one bit has a value determined both by the number of binary transitions and the positions of the transitions in the values of the binary bits forming the numerical value of the address.

3. The apparatus of claim 1 wherein the memory includes at each address plural bits having values indicative of the noise content of the received bits from which the several bits are derived.

4. The apparatus of claim 1 wherein the received bits are data bits forming character segments and the memory includes at each address a first bit for indicating the value of the binary data bit from which the several bits are derived, and a character decoder responsive to a sequence of several of the first bits and a sequence of several of said at least one noise indicating bits for deriving an indication of a character formed by the sequence of the several first bits.

5. The apparatus of claim 1 wherein the received bits are data bits forming character segments and the memory includes at each address a first bit for indicating the value of the binary data bit from which the several bits are derived and plural additional bits having values indicative of the noise content of the binary data bit from which the several bits are derived, and a character decoder responsive to a sequence of several of the first bits and a sequence of said plural additional bits for deriving an indication of a character formed by the sequence of the several first bits.

6. The apparatus of claim 1 wherein the at least one bit at certain addresses having more than one transition has a first value indicating high noise content of the received bit and the at least one bit at other addresses having more than one transition has a second value indicating low noise content of the received bit.

7. The apparatus of claim 6 wherein the at least one bit at all addresses having no more than one transition has the second value.

8. The apparatus of claim 1 wherein the at least one bit at all addresses having no more than one transition has the second value wherein the at least one bit at all addresses having no more than one transition has a value indicating low noise content of the received bit.

9. The apparatus of claim 5 wherein the indication has a value indicating low noise content of the received bit in response to all combinations of the sampled bits having no more than one transition.

10. Apparatus for indicating the noise content of a received bit of a digital bit stream comprising means for sampling the binary value of the received bit several predetermined times during the received bit to derive for the received bit a several bit binary word representing the sampled values, and means responsive to the number of transitions in the binary values of the sampled bits for the received bit for deriving an indication of the noise content of the received bit.

11. The apparatus of claim 10 wherein the means for indicating is also responsive to the position of the transitions.

12. The apparatus of claim 10 wherein the means for indicating derives a single bit output.

13. The apparatus of claim 10 wherein the means for indicating derives a plural bit output signal having a value determined by the number of transitions in the binary values of the samples for each received data bit.

14. The apparatus of claim 13 wherein the binary value of the plural bit signal is also determined by the position of the transitions.

15. The apparatus of claim 10 wherein the indication has a first value indicating high noise content of the received bit in response to some combinations of the sampled bits of a received bit having more than one transition and the indication has a second value indicating low noise content of the received bit in response to other combinations of the sampled bits of a received bit having more than one transition.

16. The apparatus of claim 15 wherein the indication has the second value in response to all combinations of the sampled bits having no more than one transition.

17. A method of deriving an indication of the noise content of a bit of a binary bit stream on a signal line comprising the steps of sampling the amplitude of a signal on the signal line several times during the bit to derive for the bit on the line a several bit binary word, each bit of the several bit word having a value dependent on the amplitude of the signal on the signal line at the time the sample is taken, and responding to the number of binary value transitions in each several bit binary word to derive an indication of the noise content of the bit on the line.

18. The method of claim 17 wherein the indication is also dependent on the position of said transitions.

19. The method of claim 17 wherein the indication is derived as a plural bit signal having a binary value dependent on the number of bit transitions in each several bit word.

20. The method of claim 17 wherein the indication is a plural bit word having a value determined by the number and position of binary transitions in each several bit word.

21. The method of claim 17 wherein the received bits are data bits forming character segments and further comprising the steps of deriving for each received data bit on the line an indication of the binary value of the data bit on the line as a function of the number of binary ones and zeros of the bits of each several bit word, and combining a sequence of the derived binary bit values with the noise indications of the corresponding bits on the line to indicate a character formed by a predetermined number of sequential bits on the line.

22. The method of claim 17 wherein the indication has a first value indicating high noise content of the bit on the signal line in response to some combinations of the sampled values of a bit on the signal line having more than one transition and the indication has a second value indicating low noise content of the bit on the signal line in response to other combinations of the sampled values of a bit on the signal line having more than one transition.

23. The method of claim 22 wherein the indication has the second value in response to all combinations of the sampled values having no more than one transition.

24. The method of claim 17 wherein the indication has a value indicating low noise content of the bit on the signal line in response to all combinations of the sampled values having no more than one transition.

25. A memory to be used to derive indications of noise content of an input bit divided into at least several binary sub-bits each having a value determined by the amplitude of a sample of the input bit, the memory comprising an address input adapted to be responsive to the sub-bits, and numerous addresses addressed in response to the value of the sub-bits at the address input, each address including at least one noise indicating bit representing the noise content of the input bit, the at least one noise indicating bit at each particular address having a value determined by the number of bit transitions in the particular address.

26. The memory of claim 25 wherein there are plural noise indicating bits at each address having values quantifying the noise content of the input bit associated with the address.

27. The memory of claim 25 wherein the at least one noise indicating bit at all addresses having no more than one transition in the binary values thereof has a value indicating low noise content of the input bit.

28. The memory of claim 27 wherein the at least one noise indicating bit at certain addresses having more than one transition in the binary values thereof has the value indicating low noise content the at least one noise indicating bit at other addresses having more than one transition in the binary values thereof having a value indicating high noise content.

29. A method of deriving an indication of the noise content of a data bit of a binary data bit stream on a signal line, comprising the steps of sampling the amplitude of a signal on the signal line several times during the data bit to derive for the data bit a several bit binary word, the bit of the several bit word having a value dependent on the amplitude of the signal on the signal line at the time the sample is taken, and responding to the value of the bits in each several bit binary word to derive an indication of the noise content of each data bit, deriving for each received data bit an indication of the binary value of the data bit as a function of the number of binary ones and zeros of the bits of each several bit word, and combining a sequence of the derived binary bit values with the noise content indications of the corresponding binary bits to indicate a character formed by a predetermined number of the received sequential data bits.

* * * * *